(12) United States Patent
Wang et al.

(10) Patent No.: US 8,715,391 B2
(45) Date of Patent: May 6, 2014

(54) HIGH TEMPERATURE FILTER

(75) Inventors: Yunzhang Wang, Duncan, SC (US);
Paul J. Wesson, Greenville, SC (US);
Kirkland W. Vogt, Simpsonville, SC (US)

(73) Assignee: Milliken & Company, Spartanburg, SC (US)

( * ) Notice: Subject to any disclaimer, the term of this patent is extended or adjusted under 35 U.S.C. 154(b) by 235 days.

(21) Appl. No.: 13/443,126

(22) Filed: Apr. 10, 2012

(65) Prior Publication Data

US 2013/0263738 A1    Oct. 10, 2013

(51) Int. Cl.
*B01D 53/22*    (2006.01)

(52) U.S. Cl.
USPC ........... 95/45; 95/43; 96/4; 96/7; 96/9; 96/11; 55/482; 55/486

(58) Field of Classification Search
CPC ....... B01D 53/228; B01D 53/22; Y02C 10/10
USPC ............ 95/43, 45; 96/4, 7, 9, 11; 55/482, 486
See application file for complete search history.

(56) References Cited

U.S. PATENT DOCUMENTS

| | | | | |
|---|---|---|---|---|
| 3,809,077 | A * | 5/1974 | Hansen | 128/849 |
| 3,953,566 | A | 4/1976 | Gore | 264/288 |
| 4,110,392 | A | 8/1978 | Yamazaki | 264/127 |
| 4,187,390 | A | 2/1980 | Gore | 174/102 R |
| 4,308,303 | A | 12/1981 | Mastroianni et al. | 428/90 |
| 4,983,434 | A | 1/1991 | Sassa | 428/36.2 |
| 5,096,473 | A | 3/1992 | Sassa et al. | 55/97 |
| 5,144,536 | A * | 9/1992 | Tsukada et al. | 361/765 |
| 5,476,589 | A | 12/1995 | Bacino | 210/500.36 |
| 5,605,631 | A * | 2/1997 | Barri et al. | 210/650 |
| 5,922,166 | A | 7/1999 | Dillon | 156/324.4 |
| 6,197,079 | B1 | 3/2001 | Mori et al. | 55/385.3 |
| 6,517,919 | B1 | 2/2003 | Griffin | 428/36.1 |
| 6,723,670 | B2 | 4/2004 | Kajander et al. | 442/374 |
| 6,752,847 | B2 | 6/2004 | Smithies | 55/521 |
| 7,306,729 | B2 | 12/2007 | Bacino et al. | 210/500.22 |
| 7,648,542 | B1 | 1/2010 | Hunter | 55/382 |
| 7,972,458 | B2 | 7/2011 | Nauta et al. | 156/181 |
| 8,007,348 | B2 * | 8/2011 | Baratta | 451/523 |
| 8,119,737 | B2 * | 2/2012 | Inada et al. | 525/109 |
| 2007/0045386 | A1 * | 3/2007 | Hasegawa et al. | 228/124.6 |
| 2008/0017572 | A1 * | 1/2008 | Kudo | 210/510.1 |
| 2008/0170982 | A1 * | 7/2008 | Zhang et al. | 423/447.3 |
| 2008/0209982 | A1 * | 9/2008 | Dutta et al. | 73/23.2 |
| 2011/0261443 | A1 * | 10/2011 | Isojima et al. | 359/360 |
| 2012/0043272 | A1 * | 2/2012 | Yoshida et al. | 210/457 |
| 2013/0125970 | A1 * | 5/2013 | Ko et al. | 136/256 |

OTHER PUBLICATIONS

U.S. Appl. No. 13/362,376, filed Jan. 31, 2012, Li et al.

* cited by examiner

*Primary Examiner* — Jason M Greene
*Assistant Examiner* — Anthony Shumate
(74) *Attorney, Agent, or Firm* — Cheryl J. Brickey

(57) ABSTRACT

A high temperature filter containing a membrane, a support substrate, and a porous adhesive layer. The porous adhesive layer is adjacent the inner surface of the membrane and the inner surface of the support substrate such that the membrane and the support substrate sandwich the porous adhesive layer. The porous adhesive layer comprises an adhesive having an adhesive operating temperature of at least about 450° F. The support substrate is a woven textile, a non-woven textile, a knit textile, or a film, and has a support operating temperature of at least about 500° F.

21 Claims, 3 Drawing Sheets

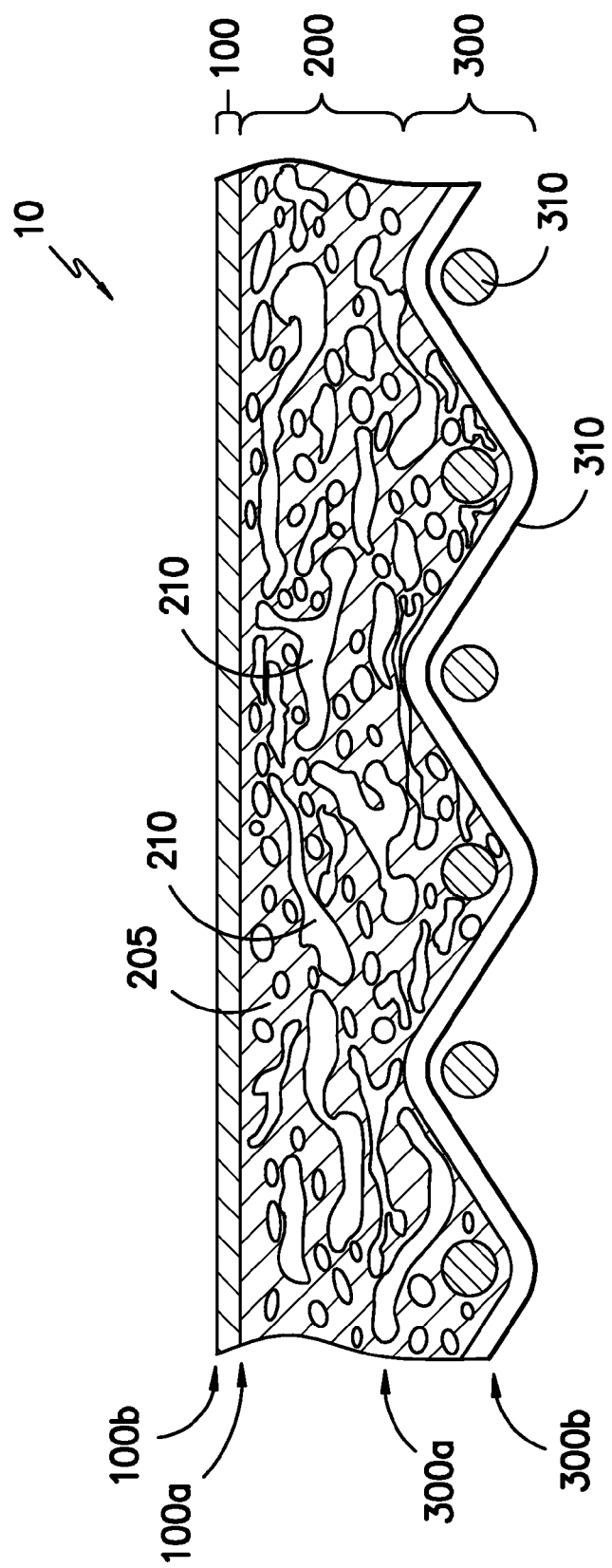
FIG. -1-

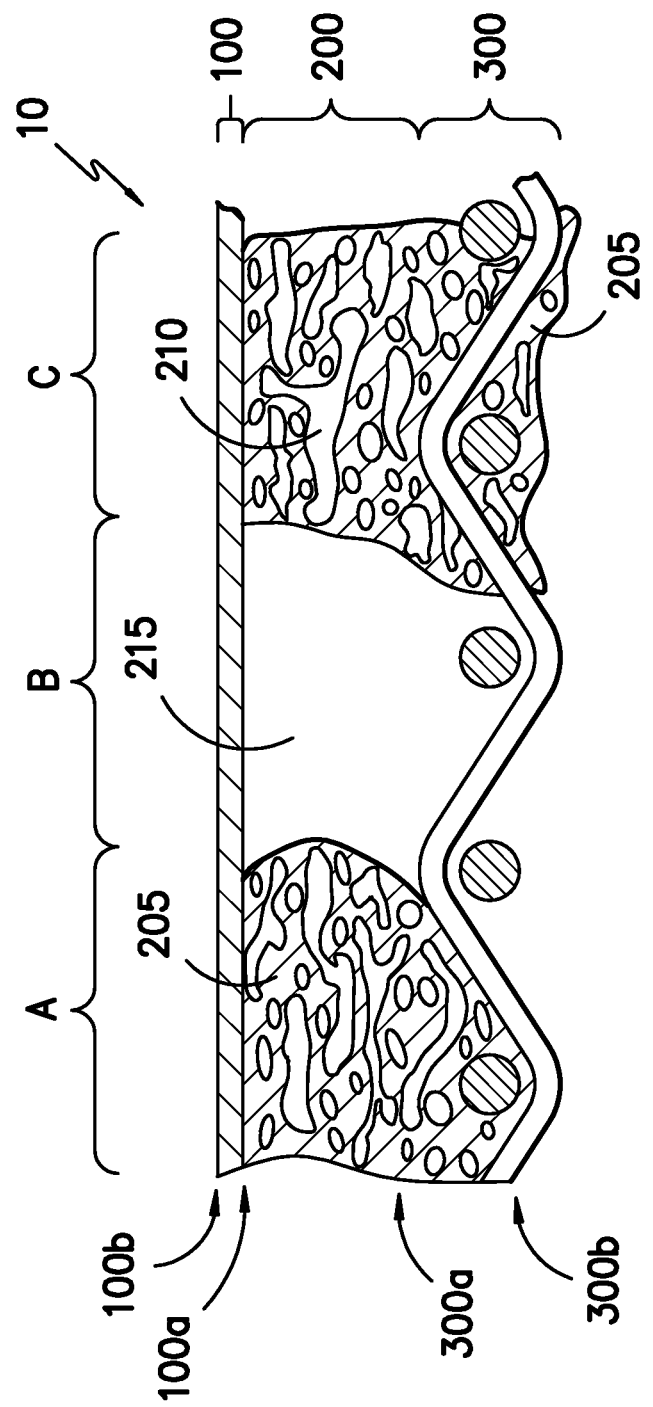
FIG. -2-

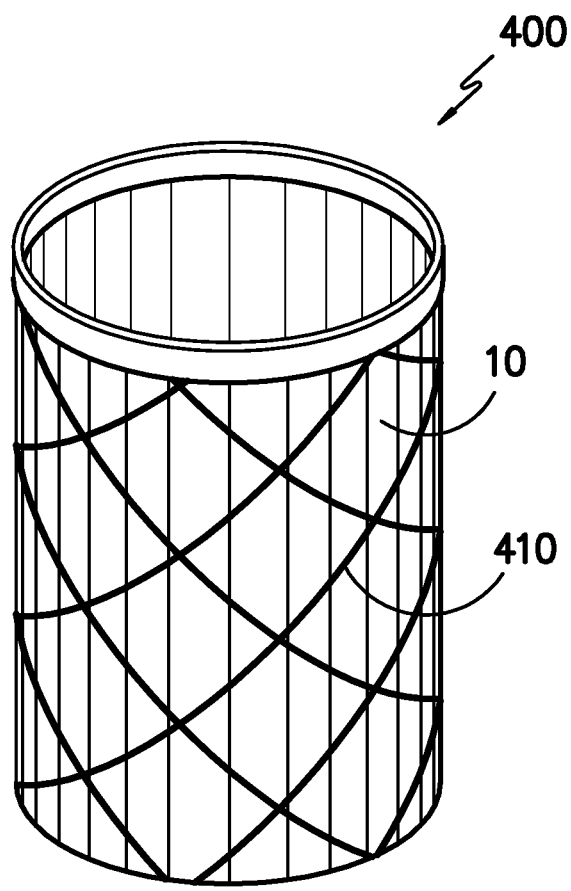
FIG. -3-

HIGH TEMPERATURE FILTER

FIELD OF THE INVENTION

The present invention generally relates to high temperature filters. More particularly the invention relates to high temperature air filters that filter particulate matter.

BACKGROUND

Bag house filtration systems are primarily used in industrial environments to remove dust, and contaminants and other particles from an air stream such as in coal fired power plants. Bag house filtration systems circulate air through the wall(s) of a bag which collects or reclaims the particles. The bag, typically formed from a textile or media, performs as both a barrier to the particles and a conduit for air to pass through. The dual functionality required for modern filter media have focused on three objectives: effectively remove particles from the air, reduce the energy required to circulate air, and to enhance the cleaning of the bags as needed.

The ability to clean the air stream circulated through the bag house systems has been referred to in the art as filtration efficiency. A measure of filtration efficiency is the ratio of downstream (output) particle concentration compared to the upstream (input) particle concentration that has passed through the bag or filter media. As more particulate is collected on the surface of the filter media the energy required to transport air through the bag (or any filter media) also increases, thus the balance between effective air cleaning and energy usage is delicate.

Energy usage in a bag house system is related to the pressure drop through the bags or filter media. Pressure drop, as used herein, refers to the difference in air pressure between each side of a filter media when there is air flow through the filter media. A low pressure drop media requires less energy to push air through the bag lessening the overall energy consumption of the system. Over time a phenomena referred to as filter cake formation occurs where the bag collects particles on its surface. As the filter cake increases in thickness the pressure drop of the filtration system increases, also increasing the energy requirements of the bag house filtration system. There is a continued need for a high temperature air filter having low pressure drop and high filtration efficiency.

BRIEF SUMMARY

The present invention provides a high temperature filter containing a membrane, a support substrate, and a porous adhesive layer. The porous adhesive layer is adjacent the inner surface of the membrane and the inner surface of the support substrate such that the membrane and the support substrate sandwich the porous adhesive layer. The porous adhesive layer comprises an adhesive having an adhesive operating temperature of at least about 450° F. The support substrate is a woven textile, a non-woven textile, a knit textile, or a film, and has a support operating temperature of at least about 500° F.

BRIEF DESCRIPTION OF THE DRAWINGS

FIG. 1 illustrates schematically a cross-section of an exemplary high temperature filter.

FIG. 2 illustrates schematically a cross-section of an additional exemplary high temperature filter.

FIG. 3 illustrates schematically a pleated filter system containing a high temperature filter.

DETAILED DESCRIPTION

Referring now to FIG. 1, there is shown one embodiment of the high temperature filter 10 containing a membrane 100, a porous adhesive layer 200, and a support substrate 300. The membrane 100 has an inner surface 100a and an outer surface 100b. The support substrate 300 has an inner surface 300a, an outer surface 300b and preferably has a support operating temperature of at least about 500° F. The porous adhesive layer 200 extends between the inner surface 100a of the membrane 100 and the inner surface 300a of the support substrate 300 and is sandwiched between the membrane 100 and the support substrate 300. The porous adhesive layer 200 contains pores and an adhesive preferably having an adhesive operating temperature of at least about 450° F. The FIGS. 1 and 2 are not drawn to scale, the adhesive layer 200 typically having a thickness similar to that of the membrane 100. The support substrate 300 is typically much thicker than the membrane 100 and the adhesive layer 200. In the Figures, the adhesive layer 200 has been enlarged in order to illustrate more clearly the voiding and porosity.

The high temperature filter 10, in one embodiment, has an air permeability of between about 1 and 30 cfm/ft$^2$. The high temperature filter 10 preferably has a thickness of between 0.2 and 10 mm and is preferably flexible enough to allow the filter to be formed into various 3 dimensional shapes for different end uses. In one use the high temperature filter is used in elevated temperature environments such as in a bag house for filtering particulates from a flue gas stream. The filter, for example, may be formed into bag-like shapes, formed into cartridges, formed into a pleated filter construction or used in a flat state.

Having a high temperature porous adhesive layer is an advantage because it maintains its physical integrity at the high adhesive operating temperatures and produces excellent adhesion between the membrane 100 and the support substrate 300 with a minimal increase in pressure drop. In some other high temperature filters, a non-porous adhesive is coated onto the support layer and/or the membrane layer thus significantly increasing the pressure drop in the filter. In other filters, the membrane and support substrate are laminated together using heat and pressure but no additional adhesive. For bonding, a portion of the membrane is compressed and physically entangled in the support substrate. The membrane and support substrate are laminated together, but the resultant filter has a higher pressure drop due to the loss of air permeability through bound or entangled portion of the membrane. In contrast, the bound portion of the membrane in the present invention by using porous adhesive is significantly smaller than that without using adhesive. In another embodiment, the adhesive layer may be porous but not have resistance to high temperatures for use in applications that do not require high temperatures.

Referring back to FIG. 1, there is shown the membrane 100 having an inner surface 100a and an outer surface 100b. In one embodiment, the outer surface 100a of the membrane 100 forms an outer surface of the high temperature filter 10. Any suitable membrane having acceptable filtration efficiency, air permeability, and melting/degradation temperature range may be used. Porous membranes, for example and preferably expanded polytetrafluoroethylene (ePTFE) membranes, have relatively small pores, relatively high permeability, and relatively high mechanical strength.

Use of an ePTFE membrane greatly enhances the performance of filter elements because the particles collect on the surface of the ePTFE, rather than in the depth of the textile filter layers. Several significant advantages may be obtained using a porous membrane as the first surface of the high temperature filter 10 that the flue gas interacts with. The high temperature filter 10 may last longer because particles do not get into the support substrate 300. Additionally, for cleanable systems, the cleaning energy needed to clean the particle cakes off of the filter may be lower because the surface of the membrane 100 is smooth and has a lower surface energy than the typical support substrate.

In one preferred embodiment, the porous membrane 100 is a porous ePTFE membrane. The porous ePTFE membranes useful in such elements are prepared by a number of different known processes, but are preferably prepared by expanding PTFE as described in U.S. Pat. Nos. 4,187,390, 4,110,392 and 3,953,566, to obtain expanded, porous PTFE. By "porous" is meant that the membrane has an air permeability of at least 2 cubic feet per minute per square foot ($cfm/ft^2$) at 0.5 inch water gauge (this unit is sometimes referred to as the Frazier number). Membranes having an air permeability of up to 30 $cfm/ft^2$, or more can also be used. The pores are micropores formed by the nodes and fibrils of the expanded PTFE. Preferred membranes of the present invention have an air permeability of at least 5, and more preferably at least 7.5, $cfm/ft^2$ at 0.5 inch water gauge, for use in gas stream filtration.

In the embodiment where the membrane is an ePTFE layer, a variety of different thicknesses can be used, including those films whose average thickness is from about 15 mil to about 0.2 mil ($15/1000$ths of an inch to about $2/10,000$ths of an inch), although thicker and thinner ePTFE layers may be utilized. In another embodiment, the ePTFE approximately 0.2 to 0.6 mil in thickness and having a pore size of about 2 to 4 microns.

The high temperature filter 10 also contains a support substrate 300 which may be any suitable support substrate for the desired end use. The support substrate 300 preferably has a support operating temperature of at least about 200° F., more preferably at least about 350° F., and more preferably at least about 500° F. In another embodiment, the support substrate 300 preferably has a support operating temperature of at least 750° F. "Support operating temperature", in this specification is defined as the maximum temperature at which the support substrate 300 has shrinkage of less than about 3%. In another embodiment, the support substrate may not have resistance to high temperatures for use in applications that do not require high temperatures.

The adhesive layer 200 preferably has an adhesive operating temperature of at least about 200° F., more preferably at least about 350° F., more preferably at least about 450° F. and more preferably at least about 500° F. In another embodiment, the support substrate 300 preferably has an adhesive operating temperature of at least 750° F. "Adhesive operating temperature" is defined to be the temperature at which the adhesive does not lose adhesion between the ePTFE and support layer through melting, decomposition, reaction to another form or material or other. Adhesion is lost when the ePTFE layer delaminates or peels away from the support layer. In another embodiment, the adhesive layer may be porous but not have resistance to high temperatures for use in applications that do not require high temperatures.

The support substrate 300 may be a woven textile, non-woven textile, knit textile, and film (preferably with apertures). In one embodiment, the support substrate 300 is a woven textile. The weave may be, for example, plain, satin, twill, basket-weave, poplin, jacquard, and crepe weave textiles. Certain woven textiles, such as glass fiber or PPS fiber based woven textiles, alone or in combination with a non-woven textile, can provide higher mechanical strength. Woven textiles are preferred because of their ability to withstand the rigors of bag house filtration systems.

In another embodiment, the support substrate 300 is a knit textile, for example a circular knit, reverse plaited circular knit, double knit, single jersey knit, two-end fleece knit, three-end fleece knit, terry knit or double loop knit, weft inserted warp knit, warp knit, and warp knit with or without a micro-denier face. The loop pile of a knit textile may be flexible and move enough that the action may aid in releasing the dust cake from the filter. In another embodiment, the support substrate 300 is a multi-axial, such as a tri-axial textile (knit, woven, or non-woven). In another embodiment, the support substrate 300 is a bias textile. In another embodiment, the support substrate 300 is a unidirectional textile and may have overlapping yarns or may have gaps between the yarns.

In another embodiment, the support substrate 300 is a non-woven textile. The term "non-woven" refers to structures incorporating a mass of yarns or fibers that are entangled and/or heat fused so as to provide a coordinated structure with a degree of internal coherency. Non-woven textiles may be formed from many processes such as for example, meltspun processes, hydroentangling processes, mechanically entangled processes, stitch-bonding processes and the like. Non-woven textiles are typically less expensive to manufacture and can provide a selected pore structures useful for a filter medium. The randomness of the fiber orientation allows one to achieve a very uniform mean pore size and the amount of mass in the nonwoven can be built up until you achieve a wide range of desired mean pore sizes.

In another embodiment, the support substrate 300 may be a film having porosity. The porosity may be achieved in any suitable manner, including but not limited to voided films, slit films, films with apertures formed by cutting, stretching, or puncturing.

The support substrate 300 has varying properties related to its desired end use. In one embodiment, the textile has an air permeability of between about 1 and 200 $cfm/ft^2$ (cubic feet per minute of air per square foot of sample). This air permeability range has been shown to suitable produce filters for flue gasses coming from coal fired power plants and other air filtration needs. More preferably, the support substrate 300 has an air permeability of between about 25 and 60 $cfm/ft^2$ measured at 125 Pa according to ASTM D737-04(2008) Standard Test Method for Air Permeability of Textile Fabrics. In another embodiment, the support substrate 300 has a mullen burst of greater than 500 PSI.

In one embodiment, the support substrate 300 is acid resistant. The materials forming the support substrate of the high temperature filter preferably can maintain sufficient mechanical properties in the presence of acids and acidic gas at elevated temperatures (120° C., up to 400° C.). Acid resistant coatings protect the fibers from the acidic environments that are found in some bag house filtration applications. Their efficiency can be measured by comparing the performance of acid resistant and non-acid resistant fabrics in a MIT flex test after an acid treatment, with the acid resistant fabrics exhibiting improved performance.

Examples of ways to create acid resistant glass include selectively removing non-$SiO_2$ compounds from the surface of the glass by leaching the anions, or by applying multiple coatings comprising one or more binding agents, a fluoropolymer, and a lubricating component. The coatings can be applied in a number of ways, including but not limited to: saturation, padding, submersion, coating, spray and exhaustion methods. Additional information may be found in U.S. Pat. Nos. 6,036,735 and 7,648,542 which are both incorporated herein by reference.

In the embodiments where the support substrate 300 is a textile, the textile contains yarns 310 which may be any suitable yarn. "Yarn", in this application, as used herein includes a monofilament elongated body, a multifilament elongated body, ribbon, strip, fiber, tape, and the like. The term yarn, in this application is defined to include a fiber. The support substrate 300 may contain one type of yarn 310 or a plurality of any one or combination of the above. The yarns 310 may be of any suitable form such as spun staple yarn, monofilament, or multifilament, single component, bi-component, or multi-component, and have any suitable cross-section shape such as circular, multi-lobal, square or rectangular (tape), and oval.

The yarns 310 may be made of any suitable material. Because the yarns may be used in flue gas environments, the fibers preferably have a melting temperature and decomposition temperature greater than the temperature of the gas that the filter 10 is filtering. Preferably, the yarns 310 have a melting temperature greater than 250° F. More preferably, the yarns 310 have a melting temperature greater than 400° F., more preferably greater than 500° F. The yarns 310 may include (but are not limited to) glass, aramid, polyphenylene sulfide, polyester, polyimide, polytetrafluoroethylene, ceramic materials, sulfo-aramid, polyoxadiazoles, polyetheretherketone, polyamide-imide, polypyridobisimidazoles, and mixtures and co-polymers thereof. In one embodiment, it is preferred to use polyphenylene sulfide (PPS) yarns because its acid resistance and high temperature stability.

In another embodiment, the yarns 310 are preferably glass yarns because of their high temperature stability and low cost. The woven textile is preferable prepared from a glass containing yarn having a size between about 600 denier and 2,400 denier. In one embodiment, the weight of the woven fabric is between about 7 opsy (oz/yd$^2$) and 25 opsy, more preferably between about 18 and 23 opsy. The woven textile, in one embodiment, has an air permeability of more than 15 cfm/ft$^2$ according to ASTM D737-75, a mullen burst strength of between about 600 and 1,000 lbs/in$^2$ according to ASTM 3786; a tensile strength of between about 150 and 500 lbs/in according to ASTM D579-89, a shrinkage of less than about 3% when heated to 500° F. for 2 hours, a flex greater than about 500,000 cycles according to ASTM D2176-63T, and an elongation of less than about 8% at 50 lbs.

The high temperature filter 10 also contains a porous adhesive layer 200. The porous adhesive layer 200 extends between the inner surface 100a of the membrane 100 and the inner surface 300a of the support substrate 300. This can be seen in FIG. 1. The porous adhesive layer 200 is continuous in the thickness direction meaning that in at least a portion of the filter, the adhesive layer 200 extends between and is adhered to both of the inner surfaces 100a, 300a (shown in FIG. 1). FIG. 2 illustrates another embodiment of the high temperature filter 10 where the porous adhesive layer 200 is considered continuous in the thickness direction as in at least a portion of the filter 10 (see areas A and C), the adhesive extends between both inner surfaces 100a, and 300a.

The porous adhesive layer 200 is continuous in the thickness direction, but may be continuous or discontinuous in the plane direction. In a continuous coating in the plane direction, the porous adhesive layer 200 covers sustainably all of the inner surfaces 100a, 300a of the membrane 100 and the support substrate 300. In another embodiment, the porous adhesive layer 200 is in a discontinuous coating in the plane direction meaning that there are areas on the inner surfaces 100a and/or 300a that are not coated with the porous adhesive layer 200.

In one embodiment, the porous adhesive layer 200 is in a patterned coating in the plane of the coating. The patterned coating may be connected or disconnected, regular and repeating or random. "Connected" when referring to the pattern in this application means that from one edge of the textile to the other edge there is a continuous path that contains the patterned coating and that at least some of the patterned coating areas are connected. "Disconnected" for the patterned coating in this application means that the pattern coated areas are discontinuous and not touching one another. In a disconnected patterned coating, there is no path from one edge of the support substrate to the other that contains all of the patterned coating. Regular or repeating patterns mean that the pattern has a repeating structure, a random pattern has no repeat to the patterned coating. In a random pattern, it is preferred that the random pattern is also disconnected. Some examples of patterned coatings include dot patterns which are disconnected and repeating. The dots may be equally spaced on the textile, or may have differing densities of dots or sizing of dots across the surface of the textile. Other pattern examples are a grid pattern and parallel line pattern which are both regular and connected. The patterned coating may take any other patterned form including but not limited to indicia, geometric shapes or patterns, and text.

In one embodiment, the patterned coating of the porous adhesive layer is substantially only on the cross-over points in the textile of the support substrate 300, for example where the weft and warp yarns cross in a woven textile. This pattern may be able to adhere the membrane 100 to the support substrate 300, while maximizing the porosity of the filter 10.

The porous adhesive layer 200 extends at least to the inner surfaces 100a, 300a, but may extend partially through or completely through the membrane 100 and/or the support substrate 300. In one embodiment, the porous adhesive layer 200 extends partially through the thickness of the support substrate 300 (thickness is defined as the distance between the inner surface 300a and the outer surface 300b). In another embodiment, the porous adhesive layer 200 extends completely through the thickness of the support substrate 300 as shown in area C of FIG. 2. In another embodiment, the porous adhesive layer 200 extends partially through the thickness of the membrane 100 (thickness is defined as the distance between the inner surface 100a and the outer surface 100b). In another embodiment, the porous adhesive layer 200 extends completely through the thickness of the membrane 100. Having the porous adhesive layer 200 partially or fully extend through the membrane 100 and or the support substrate 300 strengthens the bonding between all of the layers.

In addition the porous adhesive layer 200 containing an adhesive 205 and voids 210, the porous adhesive layer 200 may contain any other suitable additive including but not limited to conventional additives such as solvents (aqueous or non-aqueous), surfactants, foam stabilizers, thickeners, cross-linking agents, a rheology modifier, a foaming agent, a stabilizer, fillers, staple fibers, anti-blocking agents, particles, FR chemistries, colorants and/or opacifying agents, and the like, employed in the usual amounts. The voids 210 in the adhesive layer may be open celled or close celled. In an open celled construction, a majority of the cells or voids are connected to other voids. In a closed celled construction, a majority of the cells or voids are not connected to other voids. An open cell construction of voids 210 is preferred as this system typically has higher air permeability than closed cell systems.

The voids 210 in the porous adhesive layer 200 may be formed in any suitable manner. On method for creating voids for the porous adhesive layer includes mixing air into the adhesive mixture (latex mixture) and optionally stabilizing with surfactants. A second method for creating voids for the porous adhesive layer includes using a chemical blowing agent that decomposes to a gas like sodium bicarbonate/citric acid to generate carbon dioxide or azodicarbonamide to generate nitrogen. A third method for creating voids for the porous adhesive layer includes adding a physical blowing agent like pentane, or CFCs that undergo a phase transition to a gas when heat is applied.

In one embodiment, the porosity of the adhesive is formed by foaming of the adhesive by beating air into the adhesive so that the volume of the latex is increased from about 2 to about 18 times its original volume. The foamed adhesive can then be applied to the surface of the support substrate by knife coating, reverse roll coating, or other conventional procedure.

In one embodiment, the porous adhesive layer 200 is applied to the support substrate 300 by foam coating. Any foaming processes and foam coating processes known to an ordinary skill in the art can be used. In an exemplary foam coating process, the adhesive and other optionally components such as foaming agent and rheology modifiers are combined and agitated with injection of air to produce a mixture having fine air bubbles embedded relatively uniformly throughout the mixture. The density of the mixture is typically used to estimate and monitor the amount of injected air. The foaming mixture usually has a density between 0.02 $g/cm^3$ to about 0.8 $g/cm^3$, preferably, 0.02 $g/cm^3$ to 0.1 $g/cm^3$. The foaming mixture is applied to the support substrate through coating, extrusion, or other known process known to one of ordinary skills. After application, the foaming mixture is dried, preferably at elevated temperatures to remove water and entrapped air. The foamed coating allows for adhesion between layers without significant reduction in air permeability. In one embodiment, the chemistry is used with a viscosity capable of trapping many air bubbles within it creating foam, the chemistry is then laid onto the material and knife or blade is used to allow only the desired quantity of material to pass into the curing oven. When the chemistry cures the entrapped air becomes voids aiding in the permeability of the material. Coating weights range from about 0.5 $g/m^2$ to about 100 $g/m^2$, preferably between about 1 $g/m^2$ and about 40 $g/m^2$. In another embodiment, the porous adhesive layer has a weight of between about 0.1 and 40 $g/m^2$.

In one embodiment for making the filter, an open cell foamed adhesive and solvent composition is coated onto the support substrate. The solvent is then removed (preferably by using heat) resulting in the porous adhesive layer on the support layer. A membrane is then placed into the porous adhesive layer (on the side opposite the support substrate) and the sandwich is then laminated under heat and optionally pressure. In one embodiment, lamination may be performed using a heated nip or a belt laminator. The lamination temperature should be above the activation temperature of the adhesive, to help the adhesive bond the film and substrate together. Applied pressure in the nip roll is preferably as low as possible to bond the substrate and film together. In one embodiment, the pressure range is between about 0.5 lbs/in and about 1000 lbs/in with a preferred pressure of less than 100 lbs/in and a more preferred pressure of less than 50 lbs/in. The resulting structure is one embodiment of the high temperature filter. The resultant filter has a high operating temperature (both support operating temperature and adhesive operating temperature), low pressure drop, and high filtration efficiency. In one embodiment, the high temperature filter has an air permeability of at least 80% of the air permeability of the membrane.

In one embodiment, the filter 10 further comprises an abating chemistry to convert a portion of heavy metals in a flue stream. Typically the abating chemistry would be placed on the inner surface of the filter (where the air passing through the filter exits). In a bag house filter system, this would be the inner surface of the filter bag.

The optional abating chemistry contains an absorbent agent, an organic halogen producing agent, and optionally a binder. Some abating chemistry compositions are selected such that the organic halogen producing agent also acts as a binder. The organic halogen producing agent then serves to adhere to the adsorbent and to a sub-component of a filter 10.

In one embodiment, the abating chemistry is applied in an amount of between 10 and 50% by weight of the support substrate 300. In another embodiment, the coating weight of the abating chemistry is between about 2 and 200 $g/m^2$, more preferably between about 20 and 120 $g/m^2$. In one embodiment, the abating chemistry contains between about 0 and 30% wt binder, between about 30 and 50% wt absorbent agent, and between about 30 and 50% wt organic halogen producing agent. In the embodiments where the optional binder is not present, the abating chemistry may contain between about 30 and 70% wt absorbent agent and between about 30 and 70% wt organic halogen producing agent.

The abating chemistry contains an adsorbent agent. The adsorbent agent adsorbs at least a portion of the heavy metals from the gas passing through the filter. Preferably, the adsorbent agent has a BET surface area greater than 300 $m^2/g$, more preferably greater than 600 $m^2/g$. The adsorbent agent preferably does not melt or degrade at the flue gas temperature (about 400° F.) and is stable under the flue gas conditions (temperature, pressure, gas components, residence time, etc). A listing of possible adsorbent agents includes, but is not limited to activated carbon, molecular sieve, zeolite, and mixtures thereof. Preferably, the adsorbent is activated carbon. Activated carbon is preferred as it has been shown to adsorb a range of toxic metal pollutants including mercury pollutants and to be thermally stable. The adsorbent can be provided in the forms of a fine particles, granules, fibers, woven, knit or non-woven textiles. More information on the abating chemistry and its uses in a high temperature filter may be found in U.S. application Ser. No. 13/362,376 filed on Jan. 31, 2012, which is incorporated herein by reference in its entirety.

The abating chemistry also contains an organic halogen producing agent, preferably in intimate contact with the adsorbent. The organic halogen producing agent degrades at a temperature of between 250 and 400° F. such that it releases at least one of the following: hydrogen halide, halide radicals, halogen gas, elemental halogen, and halogen oxides. These degradation products then react with the mercury or other heavy metals in the flue gas stream converting the elemental heavy metal into a heavy metal halide and/or metal ions which is more easily removed from the flue gas in a later process step, such as a wet scrubber of a FGD (Flue Gas Desulfurization) unit. In one embodiment, the filter converts at least a portion of the elemental mercury passing through the filter into mercury halide and/or mercury ions. In one embodiment, the organic halogen producing agent may be, but is not limited to, polyvinyl chloride, polyvinylidene chloride, polyvinyl bromide, polydibromostyrene, copolymers comprising vinyl chloride, vinylidene chloride, vinyl bromide, or dibromostyrene, halogenated polyolefins, halogenated epoxy resins, polychloroprene, chlorosulfonated polyolefins, polychloromethylstyrene, and mixtures thereof. Preferably, the organic halogen producing agent is polyvinyl chloride, polyvinylene chloride, or a copolymer comprising vinylchloride and/or vinylidene chloride monomers. Preferably, the organic halogen producing agent is a polymer. Although the Applicants do not wish to be bound by or to any particular theory, it is believed that the organic halogen producing agent slowly produces a halogen containing species, such as hydrogen halide, over a long periods of time, thus contributing to the long lasting mercury removing and mercury oxidation performance on the filter. It is also believed that the intimate contact between the halogen producing agent and the adsorbent allows synergistic combination of mercury pollutant in the gas stream and the halogen species generated to combine on the adsorbent site for efficient oxidation reaction and more effective adsorption. It is also speculated that the adsorbent may adsorb the hydrogen halide or other halogen species and catalyze the oxidation of elemental mercury adsorbed from the gas stream. Other organic halogen producing agent conceived includes aliphatic and aromatic halogen containing compounds such as halogenated wax, hexabromocyclododecane, tetrabromophthalates, brominated phenols, brominated bisphenols, quaternary ammonium halides, and the like.

The abating chemistry optionally contains a binder. The chemistry contains a binder when the organic halogen producing agent does not act as a binder or when more binding in the chemistry is desired. The binder preferably does not melt or decompose at the temperature of flue gas and therefore has a melting temperature and a decomposition temperature of greater than about 400° F. In one embodiment, the binder may be but is not limited to acrylic polymers, silicone polymer (polydimethylsiloxane, polymethylphenyloxane, and polydiphenyloxane), polyester, polyurethane, PTFE, polyolefin, organomodified silicate, and mixtures thereof.

The process for using the filter to reduce heavy metals in a flue gas comprises passing a flue gas having a temperature of at least 250° F. and containing heavy metals through the filter described above, where the gas exiting the filter has a lower elemental heavy metal content because at least at least a portion of the heavy metals are converted to halogenated metals and at least a portion of the heavy metals are adsorbed by the abating chemistry. The heavy metal is preferably mercury. The textile may be manufactured in any known manufacturing method. The chemistry may be applied to the textile in known manner, preferably in a manner that retains a significant portion of the air permeability of the textile.

In one embodiment, a coal based activated carbon powder with a particle size ranging from about 1 micron to about 100 microns may be suspended in water in the presence of a polyacrylic acid and a sulfonated alkylaromatic surfactant under mechanical stirring. A suspension with 20% to 40% solid content can be prepared in this manner. The activated carbon suspension may be then combined with, and optionally with a thickening agent or a foaming agent (such as ammonium stearate and amine oxide surfactants). The mixture is then whipped inside a container to foamed an air bubble entrained foamed mixture, or processed through a foaming apparatus (foamer) to provide a foamed mixture. The mixture is subsequently applied to a surface of a textile layer by coating, spray, or extrusion. The textile with foamed mixture is then dried at elevated temperature to remove the entrained air and water for a filter medium.

In one preferred embodiment a filter 10 is constructed as a bag so that the membrane is exposed on the outside of the bag. The filter 10 is usually constructed of a length of between 4 and 20 ft, and between 4 and 36 inches in diameter. Multiple bags are then assembled into a bag house. The flue gas passes through the filter 10 and a portion of the particulates from the flue gas are collected on the outer surface of the filter (typically the outer surface 100b of the membrane 100). The bags are situated so that upon reverse pulse cleaning the released dust cake can be easily collected. The number of bags in the bag house is set to allow the desired volume of air to be cleaned in the bag house. Often times many bag houses will be required to treat the large amount of flue gas generated in large power facilities. Typically the dirty air will enter into a bag house containing a multitude of between 12 and 98 bags. The air will be pulled into the hanging bags and clean air will be pulled out the top of the bag house from inside of the bags.

In another embodiment as shown in FIG. 3, the filter 10 is formed into a pleated filter cartridge 400. The filter is pleated and supported by the cartridge support 410. Other filter cartridges may be produced similarly with non-pleated filters or different shapes of filters.

EXAMPLES

Test Methods

Air permeation measurements were performed according to ASTM D737 at a pressure drop of 125 Pa (0.5" w.g.). Adhesion testing was performed by pressing a 2" wide piece of painter's tape (3M 2090) against the ePTFE side of the filter then pulling it off by hand. This test was evaluated with a qualitative scoring system ranging from 1 (no visible damage to the film) to 4 (film was removed from more than 50% of the area that the tape was in contact with). A score of 2 denoted that the film split between the tape and the fabric and a score of 3 denoted that isolated spots of film were removed but only in small, disjoint areas. Filtration efficiency was measured using a TSI 8130 with NaCl particles used as the challenge particles.

Example 1

A 12" square sample of BGF Industries, Inc style 477 finish 625 acid resistant fiberglass fabric was vacuumed to remove dust and debris, then a piece of ePTFE (1.75 m wide roll from Ningbo Changqi Porous Membrane Technology Co., Ltd.) was placed on the surface on the fiberglass fabric. Air permeation was measured at specific points and recorded.

The sample was placed with the ePTFE side up on a 9 osy PPS felt on top of a larger piece of the fiberglass fabric for cushioning through the metal rollers. The ePTFE membrane was then laminated by passing the sample through a heated nip roller where the top roller was heated to at least 630° F., the bottom roller was unheated, and the nip pressure was approximately 375 lbs/in. The nip was operated at a speed of about 1.1 m/min. Once laminated, the PPS and extra fiberglass layers were removed. Scotch tape testing on 16 locations between 4 samples had an average score of 1.5 with a minimum of 1 and a maximum of 3. The average air permeation after lamination was 80% of the air permeation before lamination. Filtration testing had 95% efficiency using 300 nm challenge particles.

Example 2

A piece of BGF Industries, Inc. style 477 finish 625 acid resistant fiberglass fabric was vacuumed to remove dust and debris. It was then coated using a knife over roll setup with a foamed solution comprising 25% solids of Neoflon ND-110 FEP dispersion (fluorinated ethylene propylene), 2% by mass of Unichem, Inc. Unifroth 0154 and 2% by mass ammonium stearate. The foamed solution had a density of approximately 0.03 g/cm$^3$. The coating was metered using a knife with a 0.006" gap set above the surface of the fabric. After applying the coating, the fabric was dried at 350° F. for 3 minutes leaving a white residue on the coated surface of the fabric. A piece of ePTFE (1.75 m wide roll from Ningbo Changqi Porous Membrane Technology Co., Ltd.) was placed on the surface on the fiberglass fabric. Air permeation was measured at specific points and recorded.

The sample was placed with the ePTFE side up on a 9 osy PPS felt on top of a larger piece of the fiberglass fabric for cushioning through the metal rollers. The ePTFE membrane was then laminated by passing the sample through a heated nip roller where the top roller was heated to at least 530° F., the bottom roller was unheated, and the nip pressure was approximately 30 lbs/in. The nip was operated at a speed of about 1.1 m/min. Once laminated, the PPS and extra fiberglass layers were removed. Scotch tape testing on 12 locations between 3 samples had an average score of 1.6 with a minimum of 1 and a maximum of 2. The average air permeation after lamination was 80% of the air permeation before lamination. Filtration efficiency averaged 99% using 300 nm challenge particles.

Example 3

A 12" square sample of BGF Industries, Inc style 477 finish 625 acid resistant fiberglass fabric was covered with a 12.5 µm thick FEP film (DuPont, type A, 27.7 g/m$^2$) and then with a piece of ePTFE (1.75 m wide roll from Ningbo Changqi Porous Membrane Technology Co., Ltd.). Air permeation was measured at specific points and recorded.

The sample was placed with the ePTFE side up on a 9 osy PPS felt on top of a larger piece of the fiberglass fabric for cushioning through the metal rollers. The ePTFE membrane was then laminated by passing the sample through a heated nip roller where the top roller was heated to at least 530° F., the bottom roller was unheated, and the nip pressure was approximately 30 lbs/in. The nip was operated at a speed of about 1.1 m/min. Once laminated, the PPS and extra fiberglass layers were removed. Scotch tape testing on 16 locations between 4 samples had an average score of 1. The average air permeation after lamination was 82% of the air permeation before lamination. However, the air permeation through these samples was only 0.46 cfm/ft$^2$, roughly equivalent to the air permeation through the BGF fabric when a ⅛" rubber sheet is used to block airflow normal to the exposed (high pressure) side of the fabric during air permeation testing. Filtration efficiency was not tested on this sample due to the low air permeation.

Example 4

A 12" square sample of BGF Industries, Inc style 477 finish 625 acid resistant fiberglass fabric was manually agitated in an aqueous solution comprising 5% by mass of Neoflon ND-110 FEP dispersion for 1 minute then passed through a nip roller and dried at 350° F. until its mass stopped decreasing. The add-on of the FEP dispersion was measured by subtracting the mass of the fabric sample after coating and drying from the mass of the sample before the coating, resulting in an average add on of about 10.3 g/m$^2$. A piece of ePTFE (1.75 m wide roll from Ningbo Changqi Porous Membrane Technology Co., Ltd.) was placed over the sample and air permeation was measured at specific points and recorded.

The sample was placed with the ePTFE side up on a 9 osy PPS felt on top of a larger piece of the fiberglass fabric for cushioning through the metal rollers. The ePTFE membrane was then laminated by passing the sample through a heated nip roller where the top roller was heated to at least 530° F., the bottom roller was unheated, and the nip pressure was approximately 30 lbs/in. The nip was operated at a speed of about 1.1 m/min. Once laminated, the PPS and extra fiberglass layers were removed. Scotch tape testing on 16 locations between 4 samples had an average score of 1.9 with a minimum of 1 and a maximum of 3. The average air permeation after lamination was 64% of the air permeation before lamination. Filtration efficiency averaged 99% using 300 nm challenge particles.

Example 5

A 12" square sample of BGF Industries, Inc style 477 finish 625 acid resistant fiberglass fabric was vacuumed to remove dust and debris, then a piece of ePTFE (1.75 m wide roll from Ningbo Changqi Porous Membrane Technology Co., Ltd.) was placed on the surface on the fiberglass fabric. Air permeation was measured at specific points and recorded.

The sample was placed with the ePTFE side up on a 9 osy PPS felt on top of a larger piece of the fiberglass fabric for cushioning through the metal rollers. The ePTFE membrane was then laminated by passing the sample through a heated nip roller where the top roller was heated to at least 630° F., the bottom roller was unheated, and the nip pressure was approximately 125 lbs/in. The nip was operated at a speed of about 1.1 m/min. Once laminated, the PPS and extra fiberglass layers were removed. Scotch tape testing on 16 locations between 4 samples resulted in 12 of the 16 locations tested scoring 4. The average air permeation after lamination was 81% of the air permeation before lamination. Filtration efficiency was 96% using 300 nm challenge particles.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein.

Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A high temperature filter comprising:
   a membrane having an inner surface and an outer surface;
   a support substrate having an inner surface and an outer surface, wherein the support substrate is selected from the group consisting of a woven textile, a non-woven textile, a knit textile, and a film, and wherein the support substrate has a support operating temperature of at least about 500° F.; and,
   a porous adhesive layer, wherein the porous adhesive layer is adjacent the inner surface of the membrane and the inner surface of the support substrate such that the membrane and the support substrate sandwich the porous adhesive layer, wherein the porous adhesive layer extends between the inner surface of the membrane and the inner surface of the support substrate and comprises pores, and wherein the porous adhesive layer comprises an adhesive having an adhesive operating temperature of at least about 450° F.

2. The high temperature filter of claim 1, wherein the support substrate comprises a woven textile.

3. The high temperature filter of claim 1, wherein the membrane comprises expanded PTFE.

4. The high temperature filter of claim 1, wherein the support substrate comprises glass fibers.

5. The high temperature filter of claim 1, wherein the porous adhesive layer comprises open celled foam.

6. The high temperature filter of claim 1, wherein the adhesive comprises a fluorinated polymer.

7. The high temperature filter of claim 1, wherein the porous adhesive layer extends at least partially into the support layer.

8. The high temperature filter of claim 1, wherein the porous adhesive layer extends through the support layer to the outer surface of the support layer.

9. The high temperature filter of claim 1, wherein the adhesive is selected from the group consisting of fluorinated ethylene propylene copolymer, tetrafluoroethylene/perfluoropropylene copolymer, polyvinylidene difluoride, polytetrafluorethylene.

10. A pleated high temperature filter system comprising a housing and a pleated high temperature filter, wherein the high temperature filter comprises:
    a membrane having an inner surface and an outer surface;
    a support substrate having an inner surface and an outer surface, wherein the support substrate is selected from the group consisting of a woven textile, a non-woven textile, a knit textile, and a film, and wherein the support substrate has a support operating temperature of at least about 500° F.; and,
    a porous adhesive layer, wherein the porous adhesive layer is adjacent the inner surface of the membrane and the inner surface of the support substrate such that the membrane and the support substrate sandwich the porous adhesive layer, wherein the porous adhesive layer extends between the inner surface of the membrane and the inner surface of the support substrate and comprises pores, and wherein the porous adhesive layer comprises an adhesive having an adhesive operating temperature of at least about 450° F.

11. A method of forming a high temperature filter comprising, in order:
    forming a support substrate having an inner surface and an outer surface, wherein the support substrate is selected from the group consisting of a woven textile, a non-woven textile, a knit textile, and a film, and wherein the support substrate has a support operating temperature of at least about 500° F.;
    foam coating an open cell foamed adhesive and solvent composition onto the inner surface of the support substrate;
    removing the solvent from the open cell foamed adhesive and solvent composition forming the porous adhesive layer;
    placing a membrane having an inner surface and an outer surface onto the porous adhesive layer such that the porous adhesive layer is adjacent the inner surface of the membrane;
    laminating the membrane, porous adhesive layer, and the support substrate using heat and optionally pressure at a temperature above the adhesive operating temperature of the adhesive in the porous adhesive layer and below the support operating temperature of the support substrate.

12. The method of claim 11, wherein the open cell foamed adhesive and solvent composition further comprises a foaming agent and stabilizing agent.

13. The method of claim 11, wherein the membrane comprises expanded PTFE.

14. The method of claim 11, wherein the support substrate comprises a woven textile.

15. The method of claim 11, wherein the support substrate comprises glass fibers.

16. The method of claim 11, wherein the air permeability of the high temperature filter is at least 80% of the air permeability of the membrane.

17. The method of claim 11, wherein the adhesive comprises a fluorinated polymer.

18. A high temperature filter formed by
    a method of forming a high temperature filter comprising, in order:
    forming a support substrate having an inner surface and an outer surface, wherein the support substrate is selected from the group consisting of a woven textile, a non-woven textile, a knit textile, and a film, and wherein the support substrate has a support operating temperature of at least about 500° F.;
    foam coating an open cell foamed adhesive and solvent composition onto the inner surface of the support substrate;
    removing the solvent from the open cell foamed adhesive and solvent composition forming the porous adhesive layer;
    placing a membrane having an inner surface and an outer surface onto the porous adhesive layer such that the porous adhesive layer is adjacent the inner surface of the membrane;
    laminating the membrane, porous adhesive layer, and the support substrate using heat and optionally pressure at a temperature above the adhesive operating temperature of the adhesive in the porous adhesive layer and below the support operating temperature of the support substrate.

19. A bag house comprising a plurality of high temperature filters of claim 1.

20. The process of reducing particulates in a flue gas comprising:

> passing a flue gas having a temperature of at least 250° F. and containing particulates through a high temperature filter comprising:
>
> a membrane having an inner surface and an outer surface;
>
> a support substrate having an inner surface and an outer surface, wherein the support substrate is selected from the group consisting of a woven textile, a non-woven textile, a knit textile, and a film, and wherein the support substrate has a support operating temperature of at least about 500° F.; and,
>
> a porous adhesive layer, wherein the porous adhesive layer is adjacent the inner surface of the membrane and the inner surface of the support substrate such that the membrane and the support substrate sandwich the porous adhesive layer, wherein the porous adhesive layer extends between the inner surface of the membrane and the inner surface of the support substrate and comprises pores, and wherein the porous adhesive layer comprises an adhesive having an adhesive operating temperature of at least about 450° F.;

wherein at least a portion of the particulates are collected on the outer surface of the membrane.

21. A filter comprising:

a membrane having an inner surface and an outer surface;

a support substrate having an inner surface and an outer surface, wherein the support substrate is selected from the group consisting of a woven textile, a non-woven textile, a knit textile, and a film; and, a porous adhesive layer, wherein the porous adhesive layer is adjacent the inner surface of the membrane and the inner surface of the support substrate such that the membrane and the support substrate sandwich the porous adhesive layer, wherein the porous adhesive layer extends between the inner surface of the membrane and the inner surface of the support substrate and comprises pores.

* * * * *